(12) United States Patent
Cienfuegos

(10) Patent No.: US 7,828,313 B1
(45) Date of Patent: Nov. 9, 2010

(54) ADJUSTABLE BICYCLE SEAT

(76) Inventor: Henry Cienfuegos, 351 Encanada, La Habra Heights, CA (US) 90631

( * ) Notice: Subject to any disclaimer, the term of this patent is extended or adjusted under 35 U.S.C. 154(b) by 0 days.

(21) Appl. No.: 12/615,208

(22) Filed: Nov. 9, 2009

(51) Int. Cl.
*B62K 3/02* (2006.01)

(52) U.S. Cl. .................. 280/281.1; 280/220; 280/226.1; 297/215.12

(58) Field of Classification Search ............. 280/281.1, 280/220, 226.1; 297/215.12
See application file for complete search history.

(56) References Cited

U.S. PATENT DOCUMENTS

| | | | |
|---|---|---|---|
| 510,993 | A | 12/1893 | Reiss |
| 2,639,760 | A * | 5/1953 | Von Szilagyi ............... 248/624 |
| 4,150,851 | A * | 4/1979 | Cienfuegos ............ 297/215.13 |
| 4,580,835 | A * | 4/1986 | Angell et al. .......... 297/215.13 |
| 4,807,856 | A * | 2/1989 | Teckenbrock ............... 267/132 |
| 4,919,378 | A | 4/1990 | Iwasaki et al. |
| 5,044,592 | A * | 9/1991 | Cienfuegos ................. 248/408 |
| 5,094,424 | A * | 3/1992 | Hartway ..................... 248/600 |
| 5,149,034 | A | 9/1992 | Ganaja |
| 5,224,726 | A | 7/1993 | Gill |
| 5,324,058 | A * | 6/1994 | Massaro ..................... 280/283 |
| 5,387,025 | A * | 2/1995 | Denisar ....................... 297/209 |
| 5,441,327 | A | 8/1995 | Sanderson |
| 5,772,165 | A * | 6/1998 | Schroder ................. 248/188.5 |
| 5,829,733 | A | 11/1998 | Becker |
| 5,881,988 | A * | 3/1999 | Liu ............................ 248/601 |
| 5,927,738 | A * | 7/1999 | Kesinger .................... 280/220 |
| 6,202,971 | B1 * | 3/2001 | Duncan ...................... 248/407 |
| 6,220,581 | B1 | 4/2001 | Mueller |
| 6,354,557 | B1 | 3/2002 | Walsh |
| 6,478,278 | B1 * | 11/2002 | Duncan ...................... 248/407 |
| 6,499,800 | B2 | 12/2002 | Morgan, Jr. |
| 6,585,215 | B2 | 7/2003 | Duncan |
| 6,631,947 | B2 * | 10/2003 | Faltings ................... 297/195.1 |
| 7,025,522 | B2 * | 4/2006 | Sicz et al. ................ 403/109.2 |
| 7,422,224 | B2 * | 9/2008 | Sicz et al. ................... 280/274 |

* cited by examiner

*Primary Examiner*—Lesley Morris
*Assistant Examiner*—Marlon A Arce
(74) *Attorney, Agent, or Firm*—Edgar W. Averill, Jr.; Kenneth L. Green

(57) ABSTRACT

An adjustable bicycle seat which is supported on a seat tube. The seat is vertically adjustable and held in place by a clamp. A spring is located within the tubular seat frame. The lower end of the spring is supported within the tubular seat frame. A seat tube clamp is positioned about the tubular seat frame which adjustably holds the seat tube at a desired height. Means are provided for limiting the upward movement of the seat to retain the seat tube within the tubular seat frame.

10 Claims, 6 Drawing Sheets

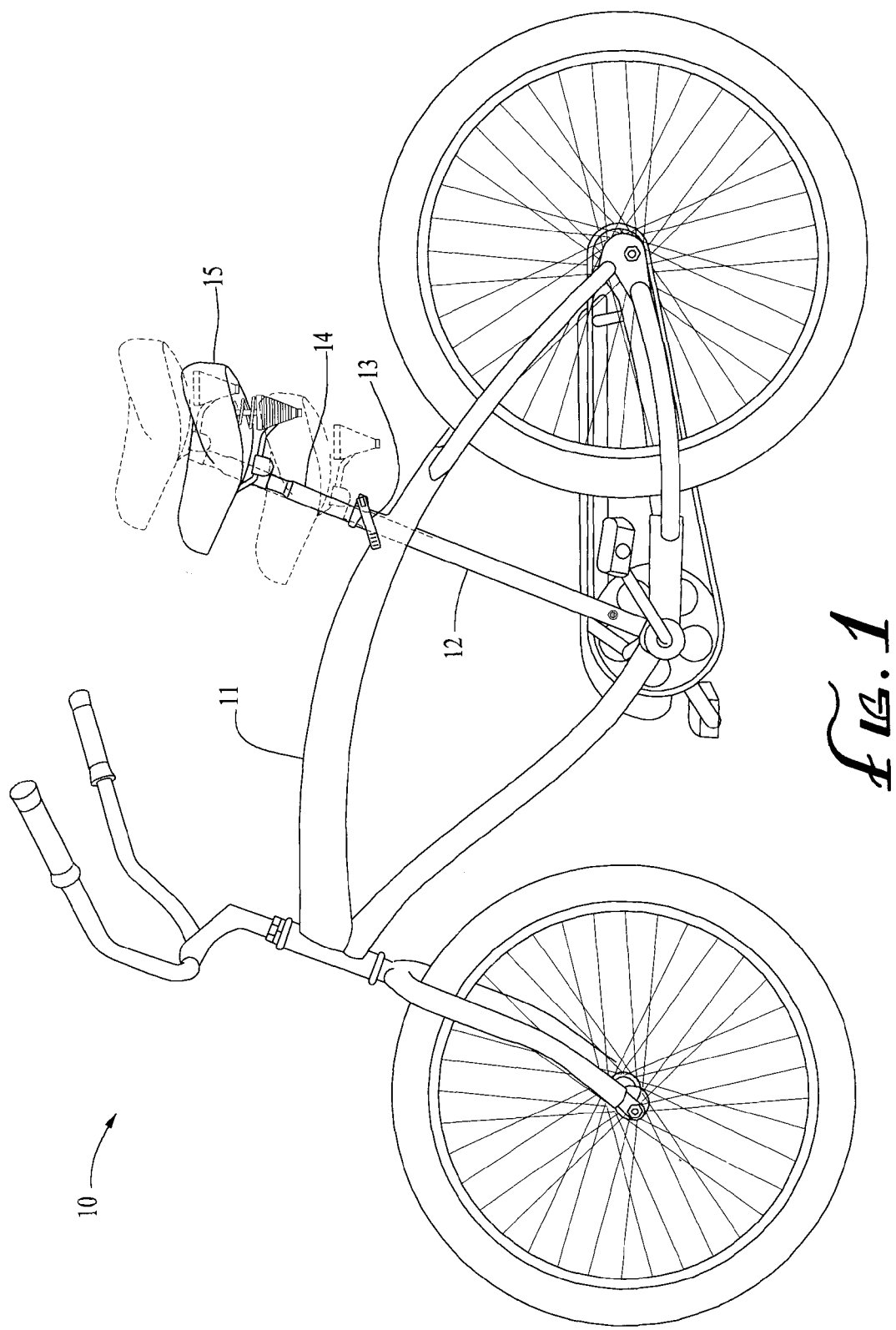

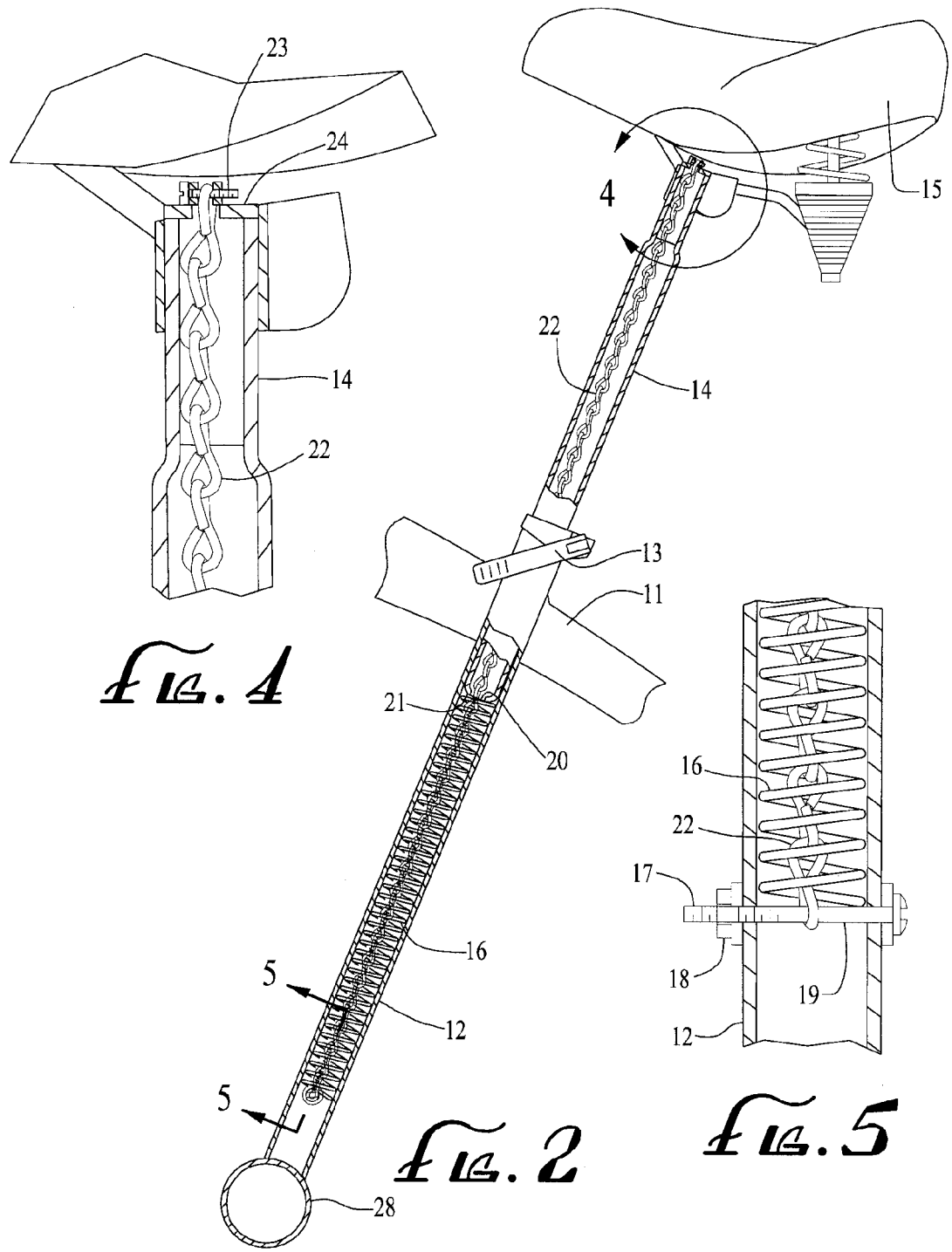

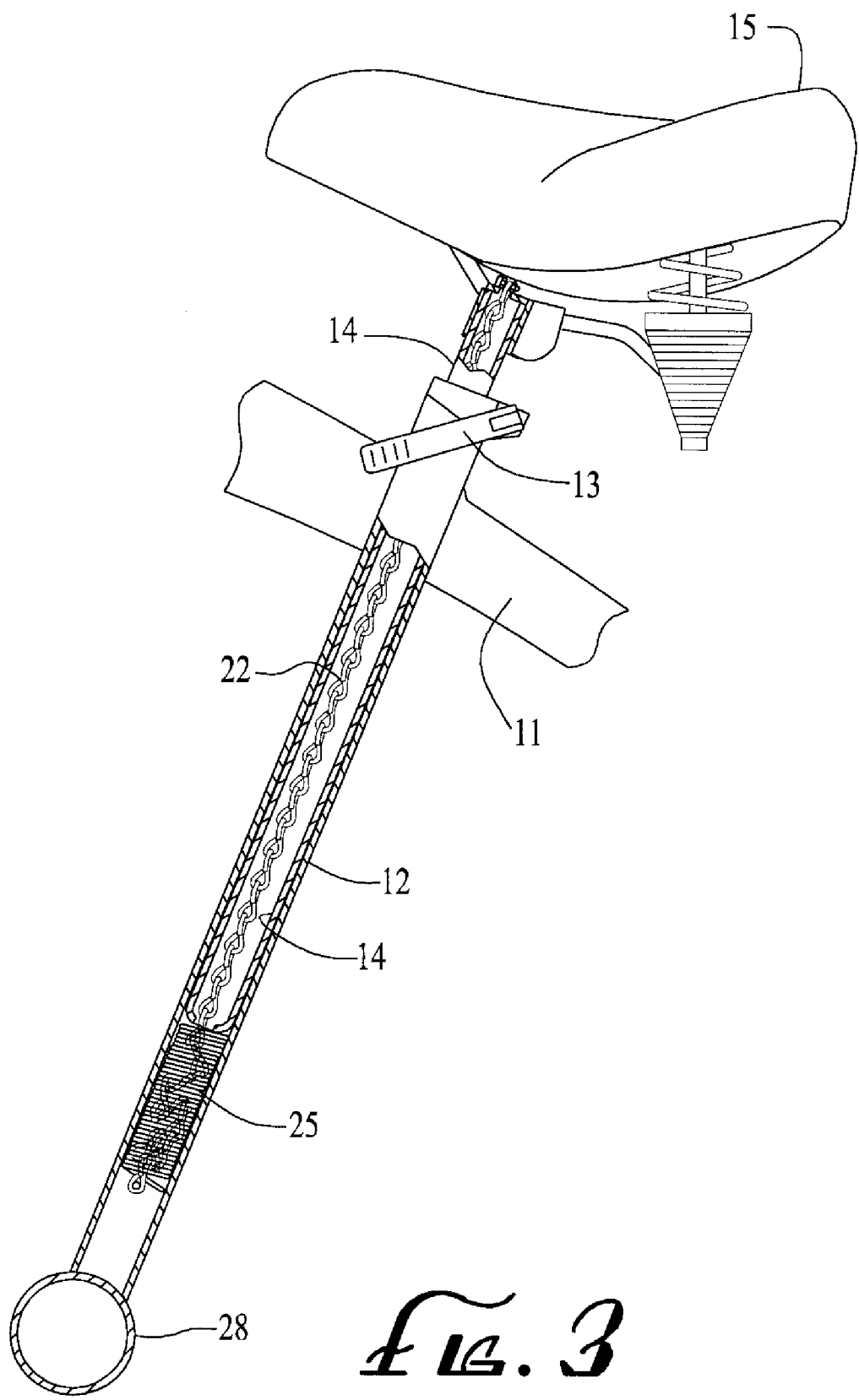

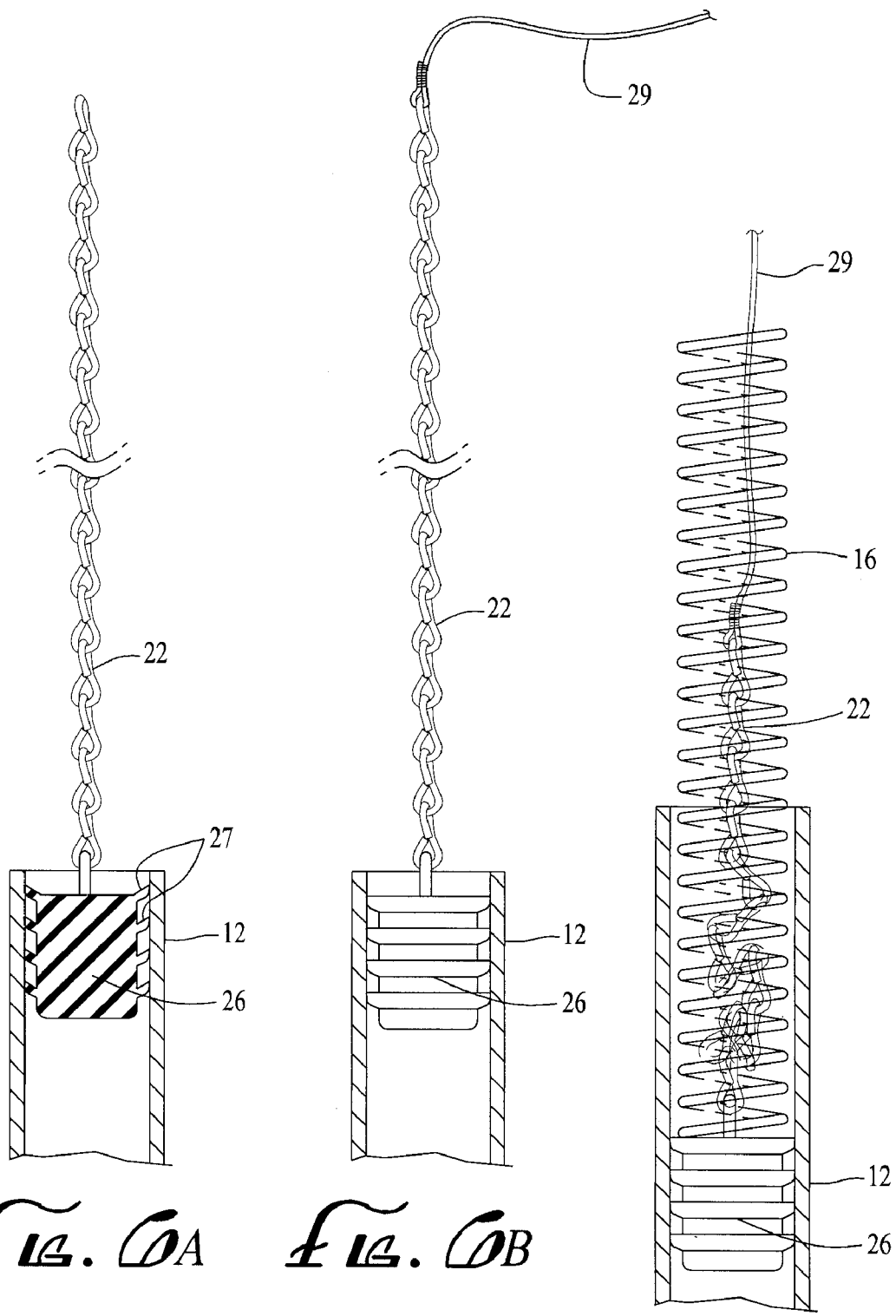

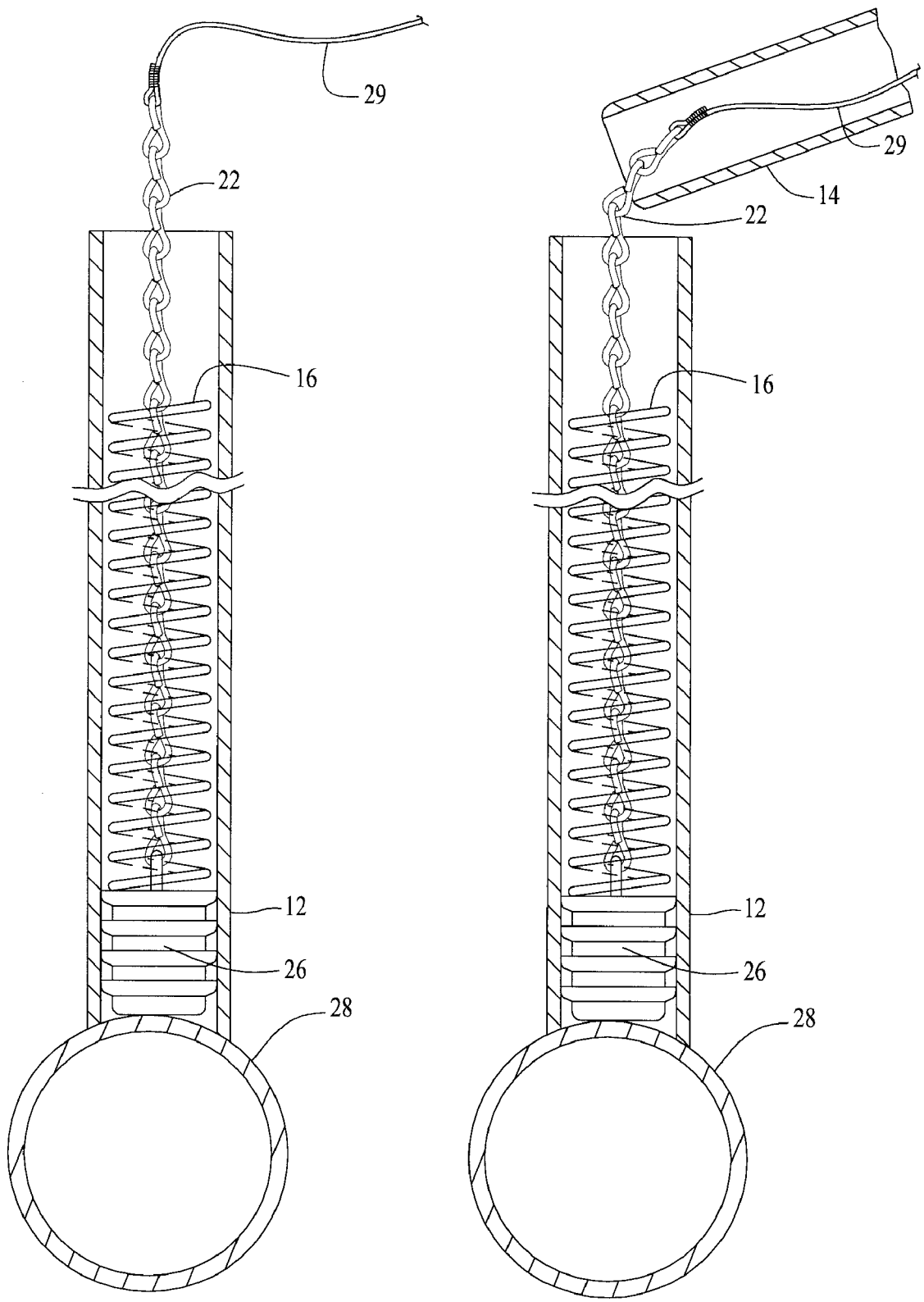

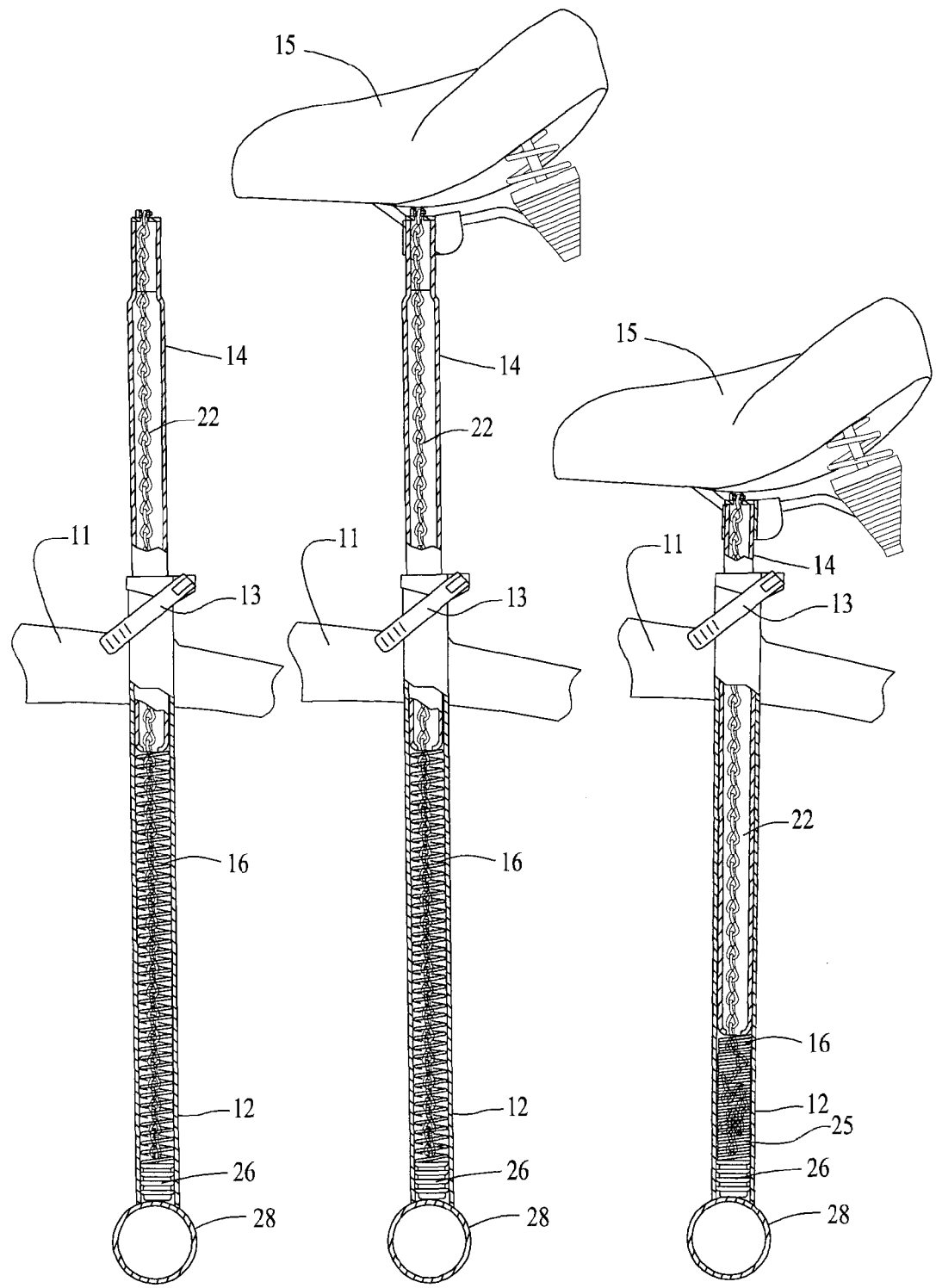

ADJUSTABLE BICYCLE SEAT

BACKGROUND OF THE DISCLOSURE

The field of the invention is bicycle seats and more further relates to bicycle seats of adjustable heights. Numerous attempts have been made to provide a bicycle seat which may be easily adjusted in height by the user.

A mechanism for automatically adjusting the height of a bicycle is shown in U.S. Pat. No. 510,993. The device is constructed to facilitate the lowering of the seat to make it easier for the rider to get on the seat. A device requires a unique seat tube and utilizes a set screw riding in a slot to limit the upper movement of the seat.

U.S. Pat. No. 4,580,835 discloses a bicycle seat with an exterior spring. The location of the spring could cause injury or entanglement with the clothes of the rider.

U.S. Pat. No. 5,044,592 shows an adjustable seat for bicycle's and the like issued to the present applicant. The device has several disadvantages. The main one is the present of the mechanism on top of the horizontal seat frame which holds the seat tube or inner shaft 18 at a desired height. Furthermore it requires a unique seat tube or inner shaft in addition to outer tube 12 which adds to the weight of the device.

U.S. Pat. No. 6,220,581 shows a bicycle seat gas spring adjustment system. There is no provision for securely holding the seat post hole in the seat tube. The rapid release of the quick release 29 could cause the seat post to be ejected from the seat tube.

BRIEF SUMMARY OF THE INVENTION

The goal of the applicant is to provide a low-cost, light-weight, easily installed seat adjustment which does not protrude from the seat tube. A spring is positioned within a tubular seat spring. An upper spring end abuts a lower end of the seat tube and the side of spring is supported by the inner surface of the tubular seat frame. The seat tube clamp is positioned about a tubular seat frame, the seat tube clamp being movable between a clamped position which holds the seat tube in a fixed position with respect to the tubular seat frame and an unclamped position which permits the vertical movement of the seat tube with respect to the tubular seat frame. Means are provided for limiting the upper movement of the seat to retain the seat tube within the tubular seat frame. Preferably a securing line such as a chain or other flexible strand is positioned within the spring and the chain is affixed at an upper end to the seat tube or the seat and at a lower end is held within the tubular seat frame.

BRIEF DESCRIPTION OF DRAWINGS

FIG. 1 is a side view of the bicycle having apparatus for adjusting the height of the bicycle seat affixed thereto.

FIG. 2 is an enlarged cross sectional side view of the adjustable apparatus of the bicycle of claim 1.

FIG. 3 is a cross sectional side view analogous to FIG. 2 with the seat in its' lowermost position.

FIG. 4 is an enlarged view taken along line 4-4 FIG. 2

FIG. 5 is a cross sectional view taken along line 5-5 of FIG. 2

FIGS. 6A-6H show the steps utilized to attach the seat height adjustment mechanism in the outer tube of the tubular frame.

DESCRIPTION OF THE PREFERRED EMBODIMENT

A bicycle 10 is shown in side view in FIG. 1. Bicycle 10 has a conventional frame 11 which includes a tubular seat frame 12 a clamp 13 which holds a seat frame 12 in a preferred vertical position. Seat 15 is affixed to seat frame 12 in a conventional manner. A spring 16 is held at its lower end by a bolt and nut 17 and 18 as shown in FIG. 5. The nut and bolt support a lower chain and spring support rod 19.

As shown in FIG. 2 spring 16 has an upper end 20 that abuts the base 21 of seat frame 12. A retaining chain 22 is affixed to the upper end of the seat frame 12 as shown in FIG. 4 by a chain upper support rod 23. Support rod 23 abuts washer 24.

FIG. 2 shows the seat 15 in its uppermost position and spring 16 in an extended position. Chain 22 prevents the further extension of seat frame 12 out of tubular seat frame 12.

Seat 15 is shown in it's lowermost position in FIG. 3 where it can be seen that spring 16 is compressed as indicated by reference character 25.

In use the rider mounts seat 15 and if the seat is not at the desired height loosens clamp 3 and by shifting the riders weight to either the ground surface or the pedals raises or lowers the seat to a desired height. The rider then tightens clamp 13 at the desired height. This change in height can be easily accomplished while coasting or at rest. The device is inexpensive and light weight and is not protrude from the conventional frame 11 of the bicycle 10.

An alternate method of retaining the lower end of chain 22 and preventing the chain from lifting out of the seat frame 12 is shown in FIGS. 6A-6H. A polymeric (plastic or rubber) block 26 having extended rings 27 is pressed into seat frame 12 and abuts pedal frame 28.

The steps needed to insert the seat adjustment apparatus into a conventional bicycle are shown in FIGS. 6A-6L. In FIG. 6A the block 26 is inserted into seat tube 14 with the chain 22 extending out of the upper end of seat frame 12. In FIG. 6B a tie is affixed to the upper end of chain 22 which is then inserted into the center of spring 16 as shown in FIG. 6C.

Spring 16 is then pressed downwardly to move block 26 into contact with pedal frame 28 as shown in FIG. 6D. Tie 29 is held above spring 16.

Next tie 29 is passed through the center of seat tube 14 as shown in FIG. 6e. As shown in FIG. 6F seat tube 14 is passed into seat frame 12. The upper end of chain 22 is affixed to the upper end of seat tube 14 as shown in FIG. 4. Next as shown in FIG. 6G the seat is affixed in a conventional manner to the upper end of seat tube 14. Next the seat is pressed downwardly by a rider and clamp 13 is tightened at a desired height. The result is an easy to install, low-cost and light-weight seat adjustment mechanism. The mechanism has no part which extends beyond a conventional bicycle frame and thus provides no place for the catching of clothing or increased wind resistance.

I claim:

1. An apparatus with a seat which is supported on a seat tube which is vertically adjustably held in a tubular seat frame which seat tube is clamped to the tubular seat frame at a desired height which seat may be adjusted in height while in use comprising:

a spring within the tubular seat frame having a lower spring end supported within said tubular seat frame, an upper spring end abutting a lower end of the seat tube, and a side of said spring supported by an inner surface of said tubular seat frame which spring urges the seat tube and its associated seat upwardly with respect to said tubular seat frame; and a seat tube clamp positioned about said tubular seat frame, said seat tube clamp movable between a clamped position which holds the seat tube in a fixed position with respect to said tubular seat frame and an unclamped position which permits the vertical movement of the seat tube with respect to the tubular seat frame whereby a user may adjust the height of the seat while seated thereon by loosening the clamp thereby allowing the spring to raise the seat and then exerting downward pressure on the seat to lower the seat to a desired seat height and then clamping the seat tube at the desired seat height further including means for limiting the upward movement of the seat to retain the seat tube within the tubular seat frame comprising a securing line positioned within said spring and said seat tube, said securing line being affixed at an upper securing line end to one of said seat tube and said seat and at a lower securing line end within said tubular seat frame.

2. The apparatus of claim 1 wherein said securing line is a chain.

3. The apparatus of claim 2 wherein said chain lower end is affixed by a pin held by said tubular seat frame.

4. The apparatus of claim 2 wherein said chain lower end is affixed to a cylindrical block having a block lower end abutting a pedal frame and including a friction member extending from sides of said cylindrical block abutting the inner surface of the tubular seat frame, which cylindrical block has an upper surface supporting the lower end of said spring.

5. The apparatus of claim 4 wherein said friction member comprises a polymeric ring.

6. The apparatus of claim 2 wherein said upper end of said chain is affixed to said seat tube at the upper end of said seat tube.

7. A bicycle with a seat which is supported on a seat tube which is vertically adjustably held in a tubular seat frame which seat tube is clamped to the tubular seat frame at a desired height which seat may be adjusted in height while in use comprising:

a spring within the tubular seat frame having a lower spring end supported within said tubular seat frame, an upper spring end abutting a lower end of the seat tube, and a side of said spring supported by an inner surface of said tubular seat frame which spring urges the seat tube and its associated seat upwardly with respect to said tubular seat frame;

a seat tube clamp positioned about an upper end of said tubular seat frame, said seat tube clamp movable between a clamped position which holds the seat tube in a fixed position with respect to said tubular seat frame and an unclamped position which permits the vertical movement of the seat tube with respect to the tubular seat frame; and a flexible strand held within said spring held at an upper end fixed with respect to said seat and supported to prevent downward movement with respect to said tubular seat frame, said flexible strand being of a length sufficiently short to prevent the seat tube from leaving said tubular seat frame, whereby a user may adjust the height of the seat while seated thereon by loosening the clamp thereby allowing the seat to rise by extension of the spring and then exerting downward pressure on the seat to a desired seat height and then clamping the seat tube at the desired seat height.

8. A method for converting a conventional seat support structure on a bicycle to permit the adjustment of the height of the seat with respect to said bicycle, said bicycle being of the type having a frame including a tubular seat frame, a seat tube held partially within said tubular seat frame and secured to the tubular seat frame by a clamp and a seat affixed to said tubular seat frame comprising the steps of:

loosening the clamp and removing the seat tube from the tubular seat frame;

inserting a spring into said tubular seat frame so that an outer surface of the spring abuts the inner surface of the tubular seat frame;

affixing a line with an upper end and a lower end, said upper end affixed to one of said seat tube and said seat and affixing the lower end to said frame;

reinserting the seat tube into said tubular seat frame; and tightening the clamp.

9. The process of claim 8 further including means for preventing the seat tube from being ejected from said tubular seat frame comprising the steps of:

removing the seat from the seat tube;

affixing the lower end of a flexible strand within said tubular seat frame to said tubular seat frame;

affixing an elongated tie to the upper end of said flexible strand of sufficient length to extend from an upper end of said seat tube;

passing the tie and flexible strand through a spring;

passing the tie and upper end of the flexible strand through the seat tube so that the tie extends above said seat tube;

replacing said seat;

compressing said spring in said tubular seat frame by moving the seat tube downwardly in said tubular seat frame while securing said tie above said seat tube to an extent that the upper end of said flexible strand extends above said seat tube;

affixing the upper end of said flexible strand to the upper end of said seat tube; and replacing the seat.

10. The process of claim 8 further including means for preventing the seat tube from being ejected from said tubular seat frame comprising the steps of:

removing the seat from the seat tube;

affixing the lower end of a flexible strand to a cylindrical block which will move downwardly but not upwardly within said tubular seat frame; inserting said block into said tubular seat frame;

affixing a tie to the upper end of said flexible strand;

passing the tie and the upper end of the flexible strand upwardly into the center of the spring;

pushing the spring and block down into tubular seat frame;

passing the tie upwardly through the seat tube;

inserting the seat tube into the tubular seat frame;

affixing the seat to the seat tube;

compressing the spring a sufficient distance so that the upper end of the flexible strand extends above the upper end of said seat tube and tightening the clamp to hold the seat tube in a lowered position;

removing the tie;

affixing the upper end of the flexible strand to the upper end of the seat tube;

loosening the clamp;

lowering the seat to a desired height; and tightening the clamp.

* * * * *